Dec. 8, 1970 R. J. RUDA 3,546,327
METHOD OF MAKING A VENTILATED PLASTIC BAG
Filed Sept. 22, 1967
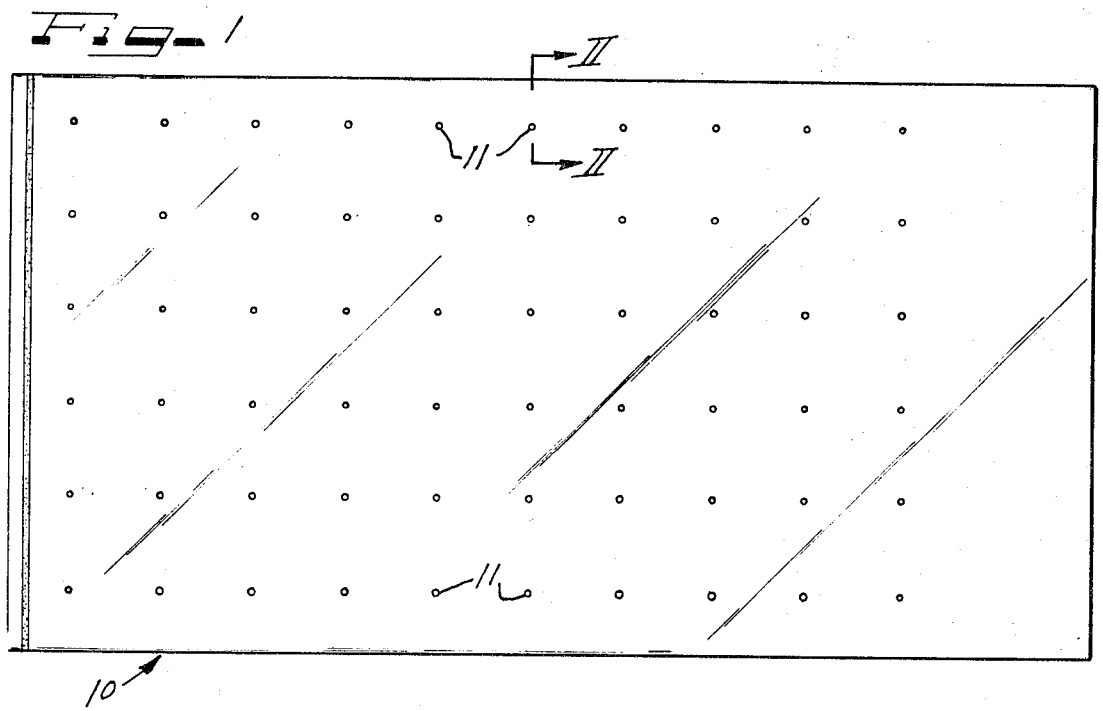
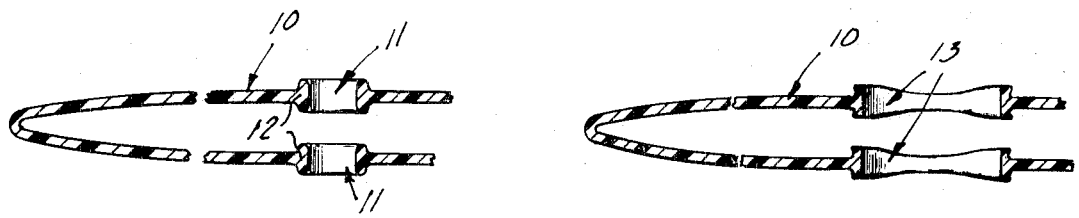
Fig-2  Fig-3
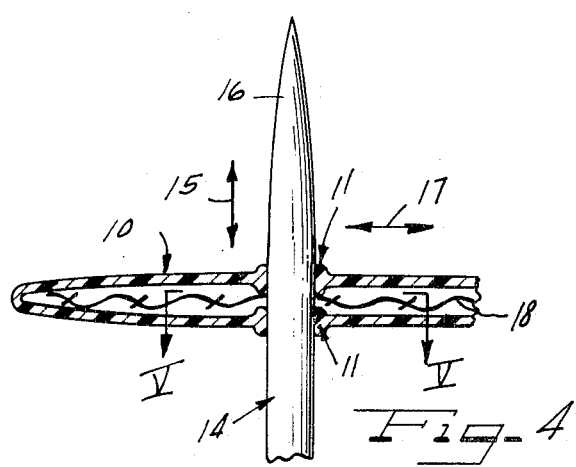
Fig-4
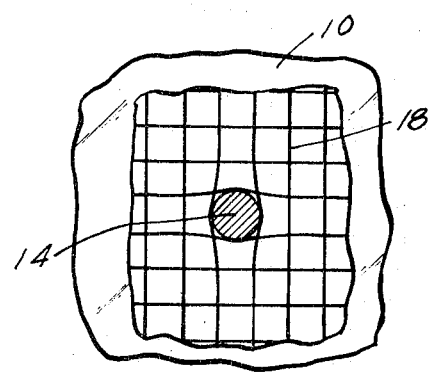
Fig-5
INVENTOR.
RAYMOND J. RUDA
BY *[signature]* ATTORNEYS

United States Patent Office 3,546,327
Patented Dec. 8, 1970

3,546,327
METHOD OF MAKING A VENTILATED PLASTIC BAG
Raymond J. Ruda, Chicago, Ill., assignor to Bagcraft Corporation of America, Chicago, Ill., a corporation of Illinois
Filed Sept. 22, 1967, Ser. No. 669,780
Int. Cl. B29c 23/00
U.S. Cl. 264—156       1 Claim

ABSTRACT OF THE DISCLOSURE

A bag of polyolefin film has an arrangement of openings each surrounded by a grommet-like formation of fused plastic. This formation is provided by inserting a heated set of needle-like rods through the film. Adjacent layers of film are separated by loosely woven cloth during formation of the openings to prevent adherence of plastic sheets to each other at the holes.

BACKGROUND

Field of the invention

This invention pertains to plastic bags, and more specifically to a plastic bag having an arrangement of ventilation openings.

Prior art

Heretofore, polyethylene film has been used as a material from which to make bags which are transparent, strong and easily closed. For certain applications, it is desirable that the bag should have the ability to permit air or water vapor to pass therethrough, and to this end, it has been customary heretofore to die-punch or to drill holes in the plastic film. Such product made by such process often has debris produced by die-punching or by the drilling of holes left to contaminate the interior of the bag. Further, while polyethylene is tear-resistant, there is a possibility of a tear orginating at any original hole or slot. Further, such processes inherently are accompanied by the nuisance of dies becoming dull or drills becoming dull.

SUMMARY OF THE INVENTION

The present invention includes a plastic bag of polyolefin film, such as polyethylene, which has vent openings which are encircled by and defined by a generally annular formation of polyolefin material which is integral with the film, being thicker than the film, and thus peripherally reinforcing each opening. Such structure is provided by moving a series of heated rods endwise relatively to the film surface into engagement for melting the film, the rods penetrating the film and thus controlling the diameter of the openings. Adjacent films are precluded from fusing with each other by means of a loosely woven cloth spacer, which floats.

Accordingly, it is an object of the present invention to provide a method of producing vent openings in a plastic bag which produces no debris.

A still further object of the present invention is to provide a method of producing a plastic bag which avoids the nuisance of a die or a drill becoming dull.

Yet another object of the present invention is to provide a method of producing a ventilated plastic bag wherein multiple thicknesses can be simultaneously acted on.

Many other advantages, features and additional objects of the present invention will become manifest to those versed in the art upon making reference to the detailed description and the accompanying sheet of drawings in which preferred structural embodiments incorporating the principles of the present invention are shown by way of illustrative example.

ON THE DRAWING

FIG. 1 is a plan view of a plastic bag provided with vent openings in accordance with the principles of the present invention;

FIG. 2 is a fragmentary enlarged cross-sectional view taken along line II—II of FIG. 1;

FIG. 3 is a fragmentary cross-sectional view, corresponding to FIG. 2, but of a modified form of the invention;

FIG. 4 illustrates a method of manufacture of the structure shown in FIG. 2; and FIG. 5 is a fragmentary cross-sectional view taken along line V—V of FIG. 4.

AS SHOWN ON THE DRAWING

The principles of the present invention are particularly useful when embodied in a preferred form of plastic bag such as illustrated in the drawing, generally indicated by the numeral 10. The bag 10 comprises any polyolefin film, and preferably comprises polyethylene. The film of the bag is provided with a series of vent openings 11 disposed in an arrangement or pattern as shown in FIG. 1. Any other pattern may be used, and openings may be omitted, if desired, to avoid lying in an area of the bag 10 which may carry imprinting. Similarly, the holes may be arranged in other arrangements for decorative or utilitarian purposes or to convey a message by their arrangement. Each opening 11 is encircled by and defined by a generally annular formation 12 of the same material as the film, the formations 12 being integral with the film and fused thereto. Each of the formations 12 is thicker than the film, whereby each opening 11 is peripherally reinforced. In the species of FIG. 1, the openings 11 are round, while in the species of FIG. 3, there is shown a series of openings 13 which are elongated. The elongated openings 13 are thicker at ends than along their length.

To produce the openings 11, a series of heated rod 14 is moved endwise relatively to the film surface in the direction of the arrows 15 and into engagement. More specifically, the rods 14 have tapered sharp tips 16 which render the rods needle-like, the tips 16 initially piercing and progressively increasing the size of the opening 11 in response to such progressive penetration into the film 10. The rods 14 are kept hot, as by applying heat thereto, the temperature of the rods being maintained over the melting point of the film 10. Thus the openings 11 are melted into the film. The temperature of the rods typically is in the range between 250° F. and 600° F., the exact temperature depending on the speed of operation, the melting point of the material used, and the thickness of the material used. As each of these factors increases, the temperature must be correspondingly increased. After the rods 14 have penetrated the film 10 as shown in FIG. 4, they are withdrawn.

When the rods are in the position shown in FIG. 4, if a relative movement in the direction of the arrow 17 is applied between the rods 14 and the film 10, in the plane of the film 10, the opening becomes elongated in the manner illustrated in FIG. 3 at 13. This type of relative movement tends to thicken the generally annular formation at ends of the elongated openings 13.

Although the method described can be applied to a single thickness of film, it is often advantageous to provide apertures through a number of thicknesses of film, such as two or more. Such a method is also illustrated in FIG. 4, wherein two thicknesses of film are substantially simultaneously provided with the openings 11. To preclude the fusing of one formation 11, there is provided between the layers of film 10 a loosely woven cloth 18, such as cheesecloth. This relationship is illustrated in both FIGS. 4 and 5. If desired, more than one layer of cloth may be employed.

The method described may be practiced by hand, and can be embodied in numerous types of apparatus for practicing this method. The resulting article readily permits air or water vapor to pass therethrough and is entirely free of debris, the openings being reinforced to lessen the likelihood of a tear originating from any hole or slot. The method not only avoids production of debris but minimizes the nuisance of dull dies, drills or other cutters.

The actual openings can be so small as not to be noticed by the casual observer. The thicknesses of film and grommet as shown in FIGS. 2–4 are greatly exaggerated for the purpose of clarity of illustration. The actual openings may be large and closely spaced so as to allow maximum flow through the bag. Moreover, the rods 14 may have a cross-section that is "shaped," namely one which is non-circular such as diamond-shaped to facilitate the formation of a particular pattern.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A method of providing an arrangement of peripherally reinforced vent openings in opposite sides of a bag of thermoplastic film, comprising:

(a) temperarily disposing a layer of loosely woven material having the physical properties of cheesecloth between the opposite sides of the bag as a spacer;

(b) moving a series of heated rods endwise relatively toward the bag surface, into engagement therewith, and through both of said sides and said layer;

(c) applying heat to the rods to maintain their temperature above the melting point of the film, to thereby melt a series of openings in the film having annular formations of the film material about each opening;

(d) withdrawing the rods from the film; and (e) after said formations have rigidified, removing said layer of woven material.

References Cited

UNITED STATES PATENTS

| | | | |
|---|---|---|---|
| 2,115,122 | 4/1938 | Prudden | 161—109 |
| 3,073,303 | 1/1963 | Schaar | 161—109UX |
| 3,161,554 | 12/1964 | Blackford | 156—252 |

JOHN T. GOOLKASIAN, Primary Examiner

W. E. HOAG, Assistant Examiner

U.S. Cl. X.R.

156—252, 289, 324; 161—100; 229—3.5, 88

UNITED STATES PATENT OFFICE
CERTIFICATE OF CORRECTION

Patent No. 3,546,327     Dated December 8, 1970

Inventor(s) R. J. Ruda

It is certified that error appears in the above-identified patent and that said Letters Patent are hereby corrected as shown below:

Col. 1, l. 42 -- originating -- is misspelled;

Col. 2, l. 40 "rod" should be -- rods --;

Col. 2, l. 42 "arrows" should be -- arrow --;

Col. 2, l. 71 "11, there" should be -- 11 with the adjacent formation 11, there --;

Col. 4, l. 1 -- temporarily -- is misspelled.

Signed and sealed this 8th day of June 1971.

(SEAL)
Attest:

EDWARD M. FLETCHER, JR.
Attesting Officer

WILLIAM E. SCHUYLER, JR
Commissioner of Patents